Patented Jan. 2, 1934

1,941,664

UNITED STATES PATENT OFFICE 1,941,664

COMPOSITION AND MATERIAL COMPRISING CELLULOSE ESTERS OR ETHERS

Arthur John Daly, Spondon, near Derby, England, assignor to Celanese Corporation of America, a corporation of Delaware No Drawing. Application May 25, 1929, Serial No. 366,100, and in Great Britain June 19, 1928

10 Claims. (Cl. 106—40)

This invention relates to the manufacture of plastic or celluloid-like masses, moulded articles, films, solutions, dopes, lacquers, artificial fibres or other compositions or materials having a basis of cellulose acetate or of other cellulose esters, for example cellulose nitrate, formate, propionate, or butyrate, or of cellulose ethers, for instance methyl, ethyl or benzyl cellulose.

According to the present invention such compositions or materials are improved by incorporation therein of brom-derivatives and especially poly-brom derivatives, of acidylated aromatic amines, whereby the said compositions or materials are rendered less inflammable or non-inflammable.

For the purpose of the present invention any brom-derivatives of acidylated aromatic amines may be employed, for example acetyl-4-brom-methylanilide, acetyl-2.4- or 3.4-dibrom-anilide, actyl-2.4.6- or 2.4.5-tribrom-anilide, diacetyl-2.4.6-tribrom-anilide, acetyl-2.4.6-tribrom-methyl-anilide, diacetyl-3.5-dibrom-2-toluidide, diacetyl-1.3.6-tribrom-naphthalide, benzoyl-2.4.6-tribrom-anilide and the like.

The brom compounds may be incorporated at any convenient stage in the manufacture of the compositions or materials. For example in the manufacture of plastic or celluloid-like masses or sheetings, they may be incorporated into the cellulose acetate or other cellulose derivative together with any plasticizer which may be used and with or without the aid of volatile solvents. As examples of plasticizers which may be used the aryl sulphonamides may be mentioned and particularly the sulphonamides or mixtures of sulphonamides of U. S. Patents Nos. 1,353,382, 1,353,385, 1,501,206 and 1,454,961.

The proportions of the brom derivatives to be incorporated will vary with the composition or material to be manufactured, with the cellulose derivative used, with the degree of non-inflammability required and with the particular brom derivative employed; the higher the bromine content of the derivative used, the higher in general will be the degree of non-inflammability attained. As a general indication it may be stated that an addition to 100 parts of the cellulose acetate of 3 to 30 parts and preferably of 7 to 10 parts of a tribrom-derivative, such as mono- or di-acetyl 2.4.6-tribrom-anilide, gives very satisfactory results as regards non-inflammability. In manufacturing plastic or celluloid-like masses I prefer to employ a proportion of 7% of one of these derivatives, preferably of comparatively low melting point, while for films I find that a proportion of 10% on the cellulose acetate yields products having a high degree of non-inflammability. If the brom compounds of the present invention are to be employed as the sole plasticizers for the manufacture of plastic or celluloid-like masses, they will of course be employed in relatively large proportions.

In addition to being of great value for the manufacture of plastic masses, moulded articles, films and the like, the compounds of the invention may be used, as stated above, in manufacturing lacquers, dopes or even artificial silks and for other purposes for which cellulose acetate and other cellulose derivatives are employed.

The brom compounds of the present invention are generally very stable, but, to avoid discolouration as much as possible, they should be employed under neutral or substantially neutral conditions, particularly in the manufacture of films or sheets. Moreover as an additional precaution, though this is not in general necessary, a small proportion of a compound, for example dicyandiamide, which will absorb any bromine liberated, may be added.

Any desired additional substances, for example fillers, colouring matters, anti-acids (e. g. urea or its alkyl derivatives) or further substances to reduce inflammability for instance tricresyl phosphate, may be incorporated in the compositions or materials of the present invention.

The following examples illustrate the production of plastic masses and films, but are not to be considered as limiting the invention in any way:—

Example 1

100 parts of acetone-soluble cellulose acetate are mixed with 25 parts of the isomeric xylene mono-methyl-sulphonamides, 12 parts of tricresyl phosphate, 7 parts of diacetyl-2.4.6-tribrom-anilide, pigments or dyes as and if required, and 60 parts of ethyl alcohol. If desired the brom-anilide may be added to the mixing in the form of a solution in the alcohol. The whole is then worked in the usual manner, first in the mixers, then on rollers and afterwards in presses, after which it can be sliced, seasoned and finished as desired.

Example 2

Mono-acetyl-2.4.6-tribrom-anilide is incorporated in an ordinary cellulose acetate film forming solution in the proportion of 10 parts of brom-anilide to 100 parts of cellulose acetate.

The brom-anilide and the cellulose acetate may be dissolved together in the solvent or may be dissolved separately and the solvents mixed. The solution is then converted into films in the usual manner.

What I claim and desire to secure by Letters Patent is:—

1. A composition of matter comprising an organic substitution derivative of cellulose and an acetylated tri-brom-aniline.

2. A composition of matter comprising cellulose acetate and an acetylated tri-brom-aniline.

3. A composition of matter comprising cellulose acetate and containing 7–10%, calculated on the cellulose acetate, of an acetylated 2.4.6-tri-brom-aniline.

4. A composition of matter comprising cellulose acetate and containing 7%, calculated on the cellulose acetate, of diacetyl-2.4.6-tri-brom-anilide.

5. A composition of matter comprising a cellulose acetate, a plasticizer and 7%, calculated on the cellulose acetate, of diacetyl-2.4.6-tri-brom-anilide.

6. A composition of matter comprising cellulose acetate, a sulphonamide and 7%, calculated on the cellulose acetate, of diacetyl-2.4.6-tri-brom-anilide.

7. Process for reducing the flammability of compositions of matter comprising an organic derivative of cellulose, comprising incorporating therein an acetylated tri-brom-aniline.

8. Process for reducing the flammability of compositions of matter comprising cellulose acetate, comprising incorporation therein an acetylated tri-brom-aniline.

9. Process for reducing the flammability of compositions of matter comprising cellulose acetate, comprising incorporating therein an acetylated 2.4.6-tribrom-aniline.

10. Process for reducing the flammability of compositions of matter comprising cellulose acetate, comprising incorporating therein diacetyl-2.4.6-tribrom-anilide.

ARTHUR JOHN DALY.